US010460255B2

(12) United States Patent
Nagaraju et al.

(10) Patent No.: US 10,460,255 B2
(45) Date of Patent: Oct. 29, 2019

(54) MACHINE LEARNING IN EDGE ANALYTICS

(71) Applicant: Splunk Inc., San Francisco, CA (US)

(72) Inventors: Pradeep B. Nagaraju, San Francisco, CA (US); Adam Jamison Oliner, San Francisco, CA (US); Brian Matthew Gilmore, Alameda, CA (US); Erick Anthony Dean, Piedmont, CA (US); Jiahan Wang, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 603 days.

(21) Appl. No.: 15/224,439

(22) Filed: Jul. 29, 2016

(65) Prior Publication Data
US 2018/0032908 A1 Feb. 1, 2018

(51) Int. Cl.
*G06N 20/00* (2019.01)
*G06F 11/30* (2006.01)

(52) U.S. Cl.
CPC ............. *G06N 20/00* (2019.01); *G06F 11/30* (2013.01)

(58) Field of Classification Search
CPC ....... G06N 20/00; G06N 99/005; G06F 11/30
See application file for complete search history.

(56) References Cited

U.S. PATENT DOCUMENTS

| 7,406,401 B2 | 7/2008 | Ota et al. |
| 9,819,566 B1 | 11/2017 | Ganjam et al. |
| 2012/0117079 A1 | 5/2012 | Baum et al. |
| 2016/0063393 A1* | 3/2016 | Ramage ................. G06N 20/00 706/12 |
| 2016/0261481 A1 | 9/2016 | Ogata et al. |
| 2017/0109322 A1* | 4/2017 | McMahan ............... G06F 17/11 |
| 2017/0195424 A1 | 7/2017 | Nasir et al. |

(Continued)

FOREIGN PATENT DOCUMENTS

WO    WO-2014018687 A1 *  1/2014  .............. H04W 4/21

OTHER PUBLICATIONS

Non-Final Office Action dated Aug. 8, 2018 for U.S. Appl. No. 15/224,440 of Nagaraju et al. filed Jul. 29, 2016.

(Continued)

*Primary Examiner* — Alan Chen
*Assistant Examiner* — Urmana Islam
(74) *Attorney, Agent, or Firm* — Perkins Coie LLP

(57) ABSTRACT

Disclosed is a technique that can be performed by an electronic device. The technique can include generating raw data based on inputs to the electronic device, and sending the raw data or data items over a network to a server computer system. The sent raw data or the data items can include training data. The technique can further include receiving global model data from the server computer system over the network. The global model data may have been derived from the training data in accordance with a machine learning process. The technique can further include generating an updated local model by updating a local model associated with the electronic device based on the received global model data, and processing local data based on the updated local model to generate output data. The local data can include raw data or data items generated based on inputs to the electronic device.

27 Claims, 12 Drawing Sheets

(56) References Cited

U.S. PATENT DOCUMENTS

2018/0032915 A1    2/2018  Nagaraju et al.
2018/0375720 A1*  12/2018  Yang ...................... H04L 29/08

OTHER PUBLICATIONS

U.S. Appl. No. 15/224,440 of Nagaraju, P.B. et al. filed Jul. 29, 2016.
Final Office Action dated Apr. 8, 2019 for U.S. Appl. No. 15/224,440 of Nagaraju et al., filed Jul. 29, 2016.

* cited by examiner

MACHINE LEARNING IN EDGE ANALYTICS

FIELD

At least one embodiment of the present disclosure pertains to data analytics for edge devices on a network, and, more particularly, to improving data analytics for edge devices by use of machine learning.

BACKGROUND

Information technology environments can include various types of edge devices. In general, an edge device is an electronic device that can form an endpoint of a network connection. An edge device can be a device on an Internet-of-Things (IoT) (an "IoT device"), that can collect data and exchange data on a network. An IoT device can be connected to the network permanently or intermittently. In some cases, an IoT device may include electronics, software, sensors, and network connectivity components included in other devices, vehicles, buildings, or other items. An edge device may automatically and autonomously (e.g., without human intervention) perform machine-to-machine (M2M) communications directly with other devices (e.g., device-to-device communication) over a network and may also physically interact with its environment.

Multiple edge devices within an information technology environment can generate large amounts of data ("edge data") from diverse locations. The edge data may be generated passively (e.g., sensors collecting environmental temperatures) and/or generated actively (e.g., cameras photographing detected objects). The edge data may include machine-generated data ("machine data"), which can include performance data, diagnostic information, or any other data that can be analyzed to diagnose equipment performance problems, monitor user interactions, and to derive other insights. The large amounts and often-diverse nature of edge data in certain environments can give rise to various challenges in relation to managing, understanding and effectively utilizing the data.

A number of tools are available to analyze data generated by edge devices. To reduce the volume of the potentially vast amount of edge data that may be generated, edge data may be pre-processed based on anticipated data-analysis needs. For example, specified data items may be extracted from the edge data and stored in a database to facilitate efficient retrieval and analysis of those data items at a later time. The remainder of the generated edge data typically is not saved and is discarded during pre-processing. However, as storage capacity becomes progressively less expensive and more plentiful, storing massive quantities of minimally processed or unprocessed data (collectively and individually referred to as "raw data") for later retrieval and analysis is becoming increasingly more feasible. In general, storing raw edge data and performing analysis on that data later can provide greater flexibility because it enables an analyst to analyze all of the generated edge data instead of only a small subset of it. This may, for example, enable an analyst to investigate different aspects of the edge data that previously were unavailable for analysis because massive amounts of edge data were discarded. Yet while the availability of vastly greater amounts of data provides opportunities, it also gives rise to further technical challenges.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
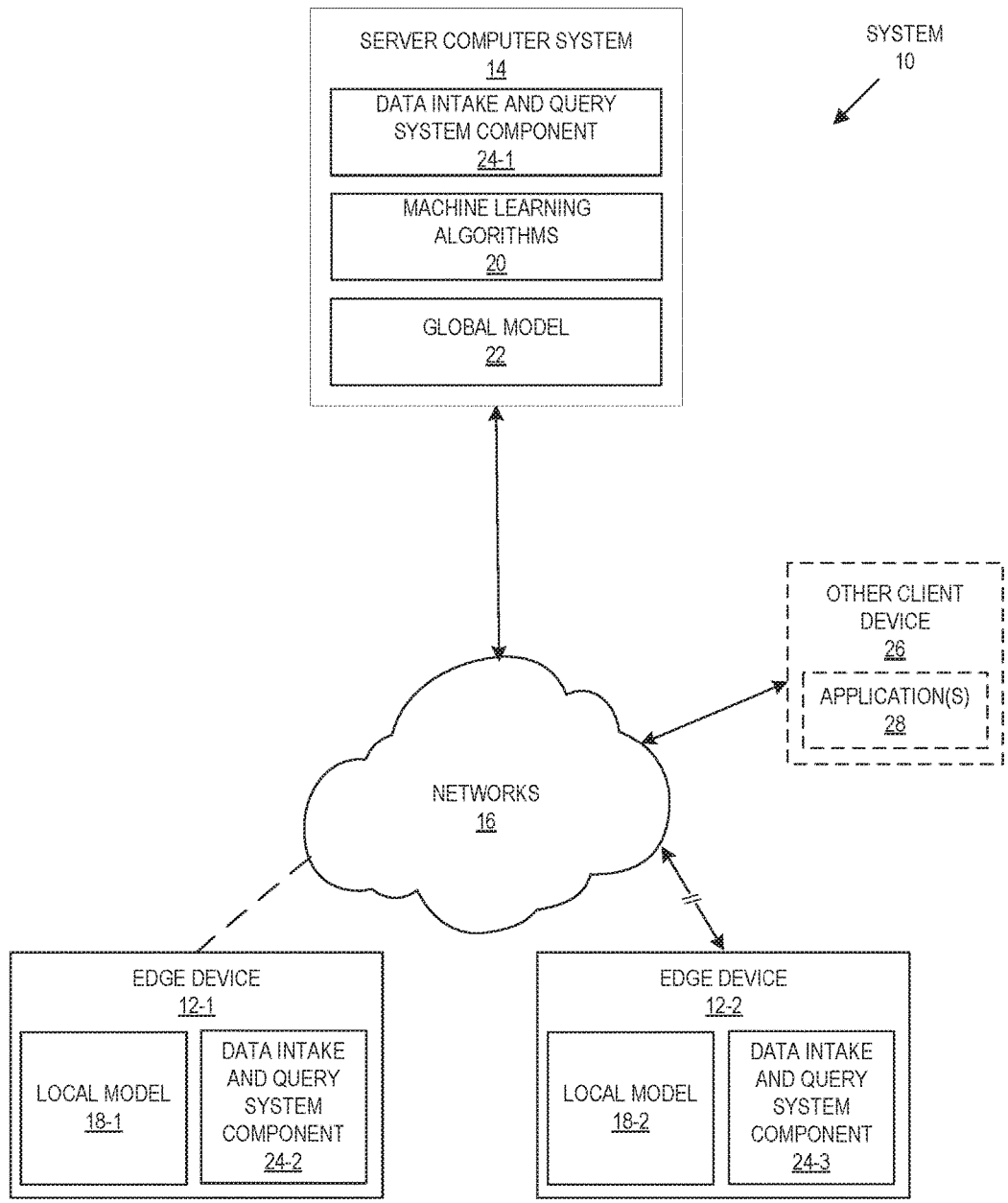
FIG. 1 is a system diagram illustrating a networked computer system.

In this description, references to "an embodiment," "one embodiment" or the like, mean that the particular feature, function, structure or characteristic being described is included in at least one embodiment of the technique introduced herein. Occurrences of such phrases in this specification do not necessarily all refer to the same embodiment. On the other hand, the embodiments referred to also are not necessarily mutually exclusive.

Edge devices can be configured to implement machine learning techniques to improve their operation and/or the edge data they generate. In particular, an edge device can build or utilize a model from a training set of input observations, to make a data-driven prediction rather than following strictly static program instructions. For example, a camera device may learn to detect certain objects and capture images of those objects when detected. The ability to recognize similar objects may improve with machine learning as the camera device processes more images of objects. However, machine learning tends to be computationally intensive and can exceed the capabilities of presently available edge devices that have limited storage and computational capabilities. In addition, localized machine learning is limited in context, having no global awareness.

Accordingly, introduced herein is a technique for improving the performance of edge devices and/or the quality of data generated by edge devices, by employing machine learning in a system that indexes, stores, and facilitates search and analysis of data generated by a network of distributed edge devices. In various embodiments, as discussed further below, a centralized machine learning process trains a model on edge data generated by all of the edge devices on a given network (or at least more than one of them) and uses the resulting "global" model to improve corresponding local machine learning models used by the individual edge devices and thereby improves the performance of each individual edge device.

The edge devices can index and store data generated locally based on inputs to the edge devices. The edge devices can each process the generated data with a local model to perform local actions. The local model at each edge device can be updated according to a machine-learning process implemented globally across all edge devices and/or locally at each edge device in a given system.

The system in certain embodiments includes a server computer system that can index and store edge data obtained from the network of edge devices (collectively "global edge data"). The server computer system updates a global machine-learning model ("global model") by training the global model using the global edge data from all (or at least more than one) of the edge devices. The server computer system can send model data (e.g., the updated global model itself, just an updated portion of the global model, or other data indicative of how the global model has been updated) to each of the edge devices. Each edge device can then use the model data to replace or modify its local model used to process data generated locally using a machine learning process. By locally using at each edge device a machine learning model that has been trained from data generated by itself and other edge devices, the system can improve the performance of each edge device based on the data acquired by the network of distributed edge devices. For example, the impact of flaws, aberrations or anomalies in any given edge device will tend to be lessened using this technique.

During operation, at least some of the edge devices can be communicatively connected from the server computer system intermittently. Such a connection can be via a wired or wireless link or via a combination of wired and wireless links, and can be direct or indirect. Edge data and model data can be exchanged between an edge device and the server computer system while the edge device is connected to the server computer system. The edge device can continue to operate using the local model even when the edge device is disconnected from the server computer system. In some embodiments, the edge device can use a local machine-learning process to train its local model when the edge device is disconnected from the server computer system. In some embodiments, any of the edge devices or server computer systems can use schemas to extract training data from unprocessed data or minimally processed data ("raw data") or data derived from the raw data.

Various other features of the machine learning technique introduced here will become apparent from the description that follows. First, however, it is useful to consider an example of an environment and system in which the technique can be employed, as will now be described.

1.0. General Overview

The embodiments disclosed herein generally refer to a system of distributed edge devices connected to a server computer system over a network. However, embodiments of the disclosed system can include many other computing components, such as other servers, sensors, routers, client devices, gateways and host devices that are not specifically described herein.

FIG. 1 is a system diagram illustrating a networked computer system according to an embodiment. The system 10 includes distributed edge devices 12-1 and 12-2 (also referred to collectively and individually as edge devices 12) and a server computer system 14. The edge devices 12 can be communicatively connected to the server computer system 14 over one or more networks 16. As indicated above, an edge device is generally an electronic device that can form an endpoint connection of a network. Examples of an edge device include a mobile device and an IoT device. For example, the edge devices 12 can be unmanned aerial vehicles (commonly referred to as drones) that connect to the server computer system 14 over the network 16 when the drones are within range of the wireless networks 16 but are disconnected from the network 16 otherwise.

At least some of the edge devices 12 may be only intermittently connected from the networks 16. As shown in FIG. 1, for example, edge device 12-1 is disconnected from the network 16 while edge device 12-2 is connected to the network 16. The edge devices 12 can generate edge data and provide the edge data to the server computer system 14 over the networks 16. In some embodiments, the edge devices 12 can operate autonomously or semi-autonomously to carry out designated tasks. In some embodiments, the edge devices 12 can operate under the control of a user to carry out tasks.

Each of the edge devices 12 can generate edge data locally based on inputs received by the respective edge devices 12, according to their designed functionality. For example, a drone that includes a camera can capture images of objects to generate image data. The edge devices 12 can process the edge data, perform requests from the server computer system 14, and perform numerous other computational tasks. For example, drones can process edge data with local models to identify objects in the captured images. During operation, the edge devices 12 may generate significant volumes of edge data.

The volume of edge data generated by the edge devices 12 can grow at very high rates as the number of edge devices included in the system 10 grows. Examples of edge data can include sensor data or other data generated from inputs to the edge devices 12, from which the edge devices 12 can be used to perform local actions. For example, edge data can include temperature inputs or other parameters obtained by sensors of the edge devices 12. Other examples of edge data can include application program data, system logs, network packet data, error logs, stack traces, and performance data. Edge data can also include diagnostic information, configurations, process control settings, actuator commands and other physical output commands, and many other types of data that can be analyzed to perform local actions, diagnose performance problems, monitor interactions, and derive other insights.

A number of tools are available to analyze edge data. The edge devices 12 and/or the server computer system 14 can use these tools to analyze the edge data. For example, the edge data can be communicated to the server computer system 14 from the edge devices 12 over a networks 16 when connected over the networks 16. Thus, the server computer system 14 could analyze the edge data generated by the edge devices 12. The edge devices 12 can perform actions based on the analyzed data, when returned over the network 16. In some cases, the server computer system 14 can instruct the edge devices 12 to perform actions based on an analysis performed at one or more of the edge devices 12 and/or at the server computer system 14.

In the illustrated embodiment, the edge devices 12 include local machine learning models (hereinafter simply "local models") 18. In general, a machine learning process involves an algorithm that can learn from and make predictions, classifications and/or identifications, etc. on data, rather than following a static set of program instructions. Such algorithms operate by building a model from data (e.g., local models 18). For example, machine learning algorithms can operate by building the local models 18 from edge data. In particular, the local models 18 can be trained from edge data to improve data-driven predictions expressed as outputs.

Within the field of edge data analytics, machine learning is a method used to devise complex models and algorithms that lend themselves to prediction. These analytical models allow for producing reliable, repeatable decisions and results, and can uncover hidden insights through learning from historical relationships and trends in data. Common machine learning algorithms generally involve either supervised or unsupervised learning. In supervised learning, a computer is presented with example inputs and desired outputs, with the goal of learning a rule that maps the inputs to the outputs. Unsupervised learning leaves the learning algorithm to find structure in the input without labeling the inputs or outputs. A learning algorithm can continuously learn from new inputs (e.g., training data) to improve predictions. There are various types and variations of machine learning processes known to persons skilled in the art that can be implemented in the disclosed embodiments and, as such, are not discussed herein for the sake of brevity.

Implementing machine learning exclusively at the edge devices 12 may be infeasible due to limited processing and/or memory resources at the edge devices 12. Solutions can include implementing machine learning algorithms at the server computer system 14, which can collect and use the edge data generated by the edge devices 12 to remotely train their respective local models 18. For example, the machine learning algorithm 20 can update the local models 18 in real-time or near real-time by exchanging edge data generated by the edge devices 12 with model data generated by the machine learning algorithms 20 of the server computer system 14. In some embodiments, the machine learning algorithms 20 can be changed on the fly, which would change the corresponding model computed by the machine learning algorithms 20. As a result, the edge devices 12 can learn from their edge data (with the assistance of the server computer system 14) to improve their respective local models 18, to make better predictions used to perform local actions.

However, implementing this process in real-time may be infeasible because the resulting round-trip delay time required to exchange edge data and model data can impair the ability to take actions at the edge devices in a timely manner. Moreover, communicating large volumes of edge data over the networks 16 may be impractical. Further, as indicated above, at least some the edge devices 12 may be only intermittently connected from the networks 16. As a result, the edge devices 12 would not function properly while being disconnected from the networks 16 if the edge devices 12 relied on the server computer system 14 to perform local actions in real-time.

Even if the edge devices 12 had unlimited resources, implementing machine learning exclusively at the edge devices 12 could impair the performance of some of the edge devices 12 rather than improve their performance. Specifically, edge devices that implement local machine-learning processes may learn to process the same inputs differently, which could be undesirable. For example, one edge device may be exposed to outlier inputs compared to other edge devices, which can bias that edge device to perform improperly. As a result, the edge devices 12 can potentially learn to perform much differently in response to the same inputs, and may produce erroneous and/or hyper-localized results that fail to benefit from the learnings of other edge devices. Solutions can include interconnecting the edge devices 12 over a network to share edge data. However, this solution may be infeasible because the networks 16 can have limited resources that impair the ability to share large volumes of edge data. Even if the networks 16 had unlimited resources, distributing the edge data generated by all the edge devices among all the edge devices, to independently implement machine-learning processes at each edge device, creates an undesirable amount of network traffic to perform redundant processes.

To overcome the aforementioned drawbacks, embodiments of the disclosed system 10 can include a global model 22 at the server computer system 14. The global model 22 can be intermittently trained with the edge data collected from the edge devices 12. Model data can be generated based on the global model 22, and can be subsequently provided to the edge devices 12 to update their local models 18. For example, the server computer system 14 can train the global model 22 based on the edge data generated by all the edge devices 12, and push an instance of the global model 22, a portion of the global model 22 or information related to the global model 22, to each edge device 12. The model data can be used to replace each local model 18 with the updated global model 22 or to update each local model 18. This process is described in greater detail below.

In an effort to reduce the vast amounts of raw data generated by an edge device, which is used to train the local or global model and/or is analyzed by each edge device 12 to perform local actions, tools may be used to pre-process the raw data based on anticipated data analysis needs. For example, edge data can be pre-processed with data items specified prior to operation ("predetermined data items") that may be extracted from the raw data and stored to facilitate eventual retrieval and analysis of those data items at search time. In some embodiments, the remaining of the raw data is not saved and discarded during pre-processing. Discarding massive amounts of raw data can be undesirable because valuable insights could be lost.

As storage capacity becomes progressively less expensive, there are fewer incentives to discard raw data and many reasons to retain more of the raw data. Less expensive storage is presently making it feasible to store massive quantities of minimally processed or unprocessed data ("raw data") for later retrieval and analysis. In general, storing raw data and performing analysis operations at search time can provide greater flexibility because it enables searching all of the raw data instead of searching only a small subset of it. This may enable investigating different aspects of the raw data beyond the conventional predetermined data items. As such, the disclosed embodiments allow for searching through data that was previously unavailable for analysis.

However, analyzing and searching massive quantities of raw data presents a number of challenges. For example, the edge devices may generate many different types and formats of edge data (e.g., sensor data, system logs, network packet data (e.g., wire data), application program data, error logs, stack traces, system performance data, operating system data, and virtualization data) from thousands of different components, which can collectively be very time-consuming to analyze. In another example, edge devices may generate large amounts of information relating to data access, application performance, operating system performance, and network performance. There can be tens of millions of edge devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is a leading platform for providing real-time operational intelligence that enables organizations to collect, index, and search raw data collected from various sources such as websites, applications, servers, networks, and edge devices. The SPLUNK® ENTERPRISE system is particularly useful for analyzing data from various data input sources, including sensor data, data in system log files, and network data. Although many of the techniques described herein are explained with reference to a data intake and query system similar to the SPLUNK® ENTERPRISE system, these techniques are also applicable to other types of data systems.

Figure 2:
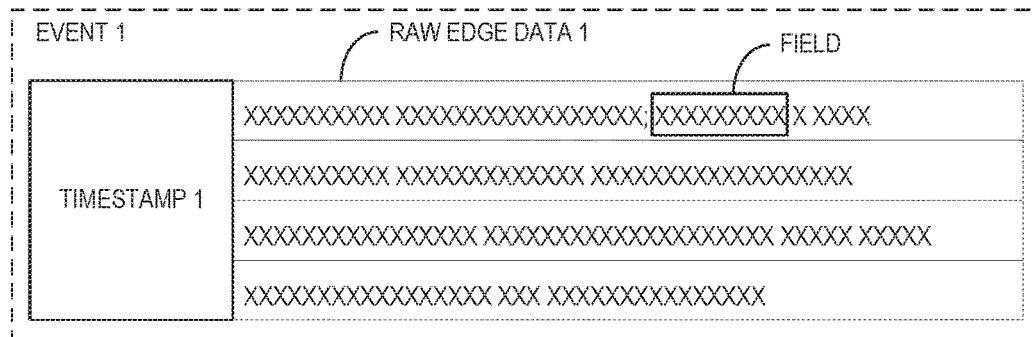
FIG. 2 is a block diagram illustrating a series of events, including raw edge data.
Figure 2:
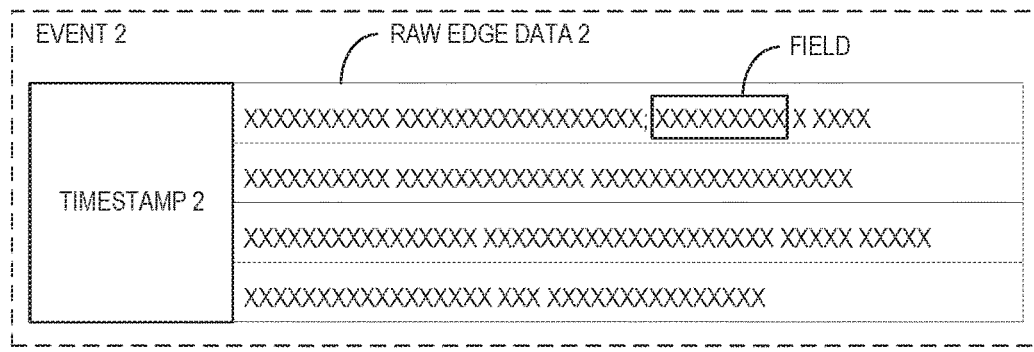
Figure 2:
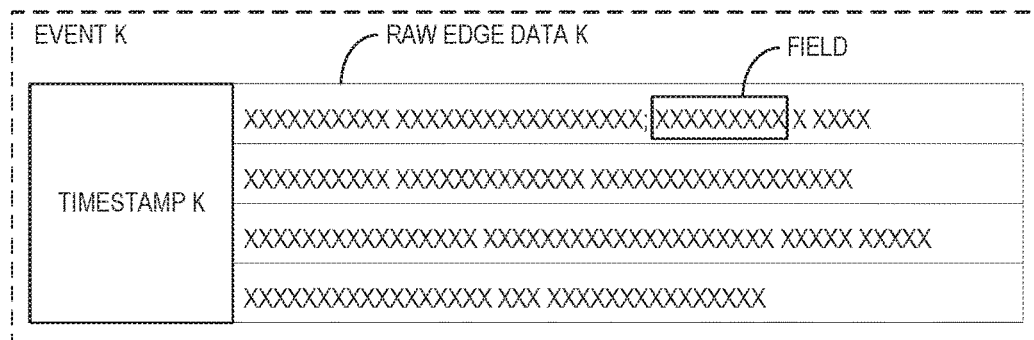

In the SPLUNK® ENTERPRISE system, raw data is collected and stored as structured "events." For example, FIG. 2 is a block diagram illustrating a series of events including raw edge data according to an embodiment. An event includes a portion of raw data and is associated with a specific point in time. For example, events may be derived from "time series data," where the time series data comprises a sequence of data points (e.g., performance measurements from a computer system) that are associated with successive points in time. As shown, each event 1 through K can be associated with a timestamp 1 through K that can be derived from the raw data in the respective event, determined through interpolation between temporally proximate events having known timestamps, or determined based on other configurable rules for associating timestamps with events.

In some instances, raw data can have a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. As shown in FIG. 2, each event 1 through K includes a field that is nine characters in length beginning after a semicolon on a first line of the raw edge data, for example. In certain embodiments, these fields can be queried to extract their contents.

In addition to edge devices, examples of components in a computing environment that may generate raw data from which events can be derived include, but are not limited to, web servers, application servers, databases, firewalls, routers, operating systems, and software applications that execute on computer systems. The data generated by such data sources can include, for example and without limitation, server log files, activity log files, configuration files, messages, network packet data, performance measurements, and sensor measurements.

The SPLUNK® ENTERPRISE system uses flexible schema to specify how to extract information from the event data. A flexible schema may be developed and redefined, as needed. Note that a flexible schema may be applied to event data "on the fly," when it is needed (e.g., at search time, index time, and ingestion time). When the schema is not applied to event data until after the raw data is indexed or at search time, it may be referred to as a "late-binding schema."

During operation, the SPLUNK® ENTERPRISE system starts with raw data (e.g., one or more system logs, streams of network packet data, sensor data, application program data, error logs, stack traces, or system performance data). The system divides this raw data into segments of raw data delineated by time segments (e.g., blocks of raw data, each associated with a specific time frame). The segments of raw data are indexed as timestamped events, corresponding to their respective time segments as shown in FIG. 2. The system stores the timestamped events in a data store.

The system then enables running queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail below, the fields are defined by extraction rules (e.g., regular expressions) that derive one or more values from a portion of raw data in each event that has a particular field specified by an extraction rule. The set of values so produced are semantically related (such as an IP address), even though the raw data in each event may be in different formats (e.g., semantically related values may be in different positions in the events derived from different sources).

As noted above, the SPLUNK® ENTERPRISE system can utilize a late-binding schema on event data while performing queries on the events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields by using a variety of techniques. In contrast to a conventional schema for a database system, a late-binding schema is not defined at data ingestion time (i.e., on or before the raw data is indexed for storage). Instead, the late-binding schema can be developed on an ongoing basis until the time a query is actually executed (which could be long after the raw data is indexed). As a result, extraction rules for the fields in a query may be provided in the query itself, or they may be located during execution of the query.

Hence, as a user learns more about the raw data in the events, the user can continue to refine the late-binding schema by adding new fields, deleting fields, or modifying the field extraction rules for use the next time the schema is applied by the system. Because the SPLUNK® ENTERPRISE system maintains the underlying raw data and can use a late-binding schema for searching the raw data, users are enabled to continue investigating and to learn valuable insights about the raw data. In contrast, conventional processes in database systems discard the raw data that was not indexed as predetermined data items. As a result, users of conventional database systems are limited to only searching predetermined data items.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

In some embodiments, the raw data utilized by the disclosed embodiments can be stored as events that are indexed by timestamps but are also associated with predetermined data items. This structure is essentially a modification of conventional database systems that require predetermining data items for subsequent searches. These systems can be modified to retain the remaining raw data for subsequent re-processing for other predetermined data items.

Specifically, the raw data can be divided into segments and indexed by timestamps. The predetermined data items can be associated with the events indexed by timestamps. The events can be searched only for the predetermined data items during search time, but the remaining raw data is available for subsequent re-processing and re-indexing for searching other data items. In other words, the events can be re-processed later in time to re-index the raw data, to generate events with new predetermined data items.

2.0. Operating Environment

Referring back to FIG. 1, the server computer system 14 and edge devices 12 are examples of computing devices included in the system 10 that are interconnected via one or more networks 16. The networks 16 broadly represent one or more LANs, WANs, cellular networks (e.g., LTE, HSPA, 3G, and other cellular technologies), and/or networks using any of wired, wireless, terrestrial microwave, or satellite links, and may include the public Internet.

The computing devices of system 10 include any combination of hardware and software configured to implement the various logical components described herein. For example, the computing devices may include one or more memories that store instructions for implementing the various components described herein, one or more hardware processors configured to execute the instructions stored in the one or more memories, and various data repositories in the one or more memories for storing data structures utilized and manipulated by the various components.

The system 10 includes a data intake and query system 24. The data intake and query system 24 can be located exclusively at the server computer system 14, or components of the data intake and query system 24 can be distributed across the server computer system 14 and the edge devices 12 (as represented collectively by elements 24-1, 24-2 and 24-3). In some embodiments, any or each of the server computer system 14 and the edge devices 12 can include its own data intake and query system 24. Examples of configurations and operations of the data intake and query system 24 are described further below.

The edge devices 12 discussed above can represent a broader category of computing devices commonly referred to as "client devices," which can each be operated under the control of a user. For example, FIG. 1 shows a client device 26 that can communicate with the components of the system 10 (e.g., the edge devices 12 or the server computer system 14) to receive or exchange information over the network 16. For example, a communication between the client device 26 and the components of the system 10 can include sending various requests and receiving data packets.

In one example, the client device 26 or applications 28 running on the client device 26 may initiate communications with applications running on the edge devices 12 or the server computer system 14 to request specific content (e.g., edge data), and the applications at the edge devices 12 or the server computer system 14 may respond with the requested content stored in one or more data packets. Hence, the components of the system 10 can also represent a broader category of computing devices referred to as "host devices," which can host each other.

2.1. Data Intake and Query System

Figure 3:
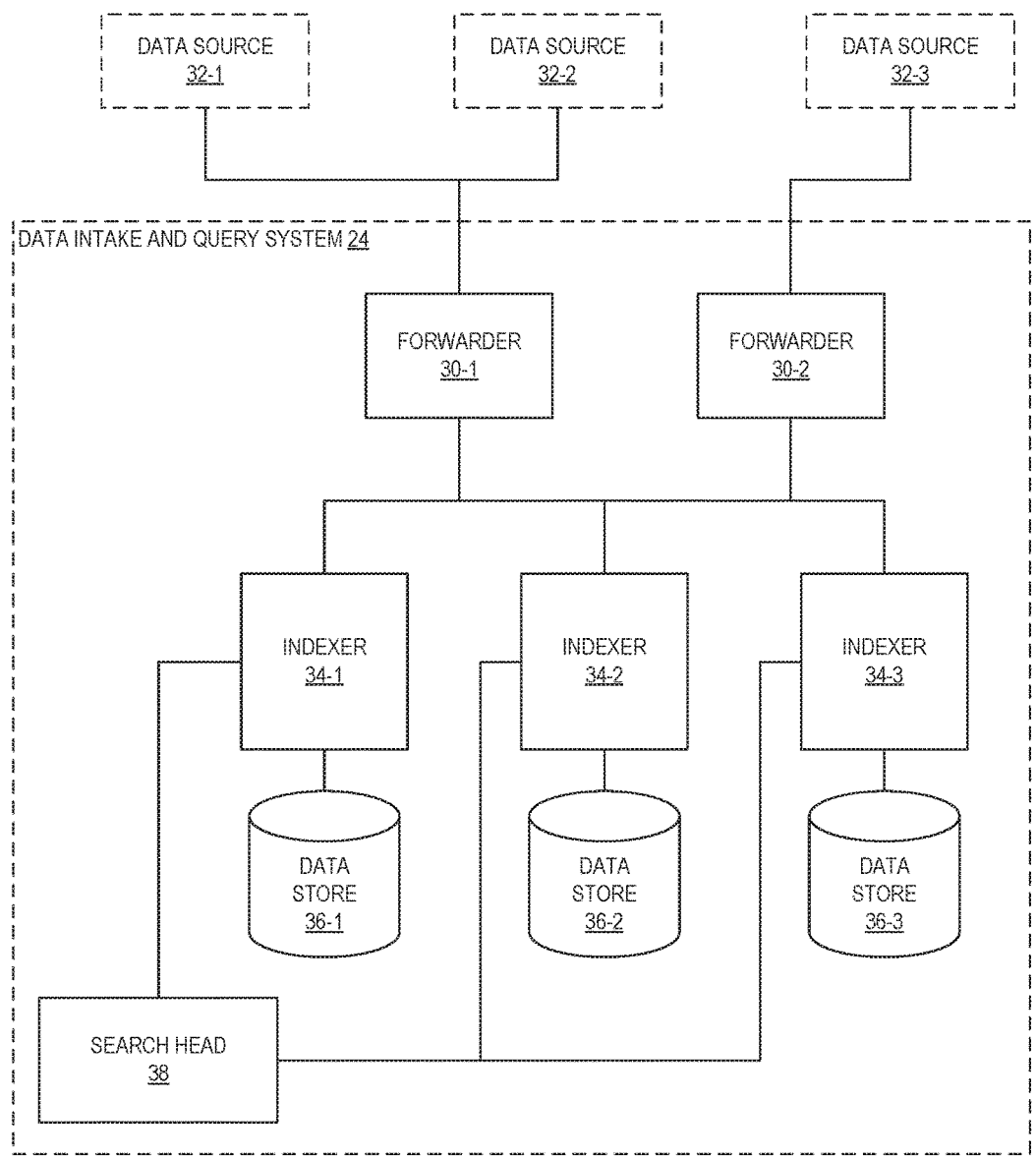
FIG. 3 is a block diagram illustrating components of a data intake and query system.

The data intake and query system 24 can be similar to or include components of the SPLUNK® ENTERPRISE system described above to create events from raw data in an effort to improve storage and analysis of such data. For example, FIG. 3 is a block diagram illustrating components of the data intake and query system 24 according to an embodiment. The data intake and query system 24 includes one or more forwarders 30 that receive data from a variety of input data sources 32, and one or more indexers 34 that process and store the data in one or more data stores 36. The forwarders 30 and indexers 34 can be included in a single computing system, or may alternatively comprise separate processes executing on multiple computer systems. For example, the forwarders 30 could be located at the edge devices 12, and the indexers could be located at the server computer system 14.

Each data source 32 broadly represents a distinct source of data that can be consumed by the data intake and query system 24. An example of the data source 32 includes the data generated by sensors of the edge devices 12. Other examples of the data sources 32 include, without limitation, data files, directories of files, event logs, and registries, or any data sent over the networks 16.

During operation, the forwarders 30 can identify which indexers 34 should receive data collected from the data sources 32 and forward the data to the appropriate indexers 34. The forwarders 30 can also perform operations on the data before forwarding, including removing extraneous data, detecting timestamps in the data, parsing data, indexing data, routing data based on criteria relating to the data being routed, and/or performing other data transformations.

In an embodiment, the forwarders 30 may comprise a service accessible to the edge devices 12 and/or server computer system 14 over the networks 16. For example, one type of forwarder may be located at an edge device 12 and can be capable of consuming vast amounts of real-time data generated by the edge device 12, and then forward the generated data to the server computer system 14. In some embodiments, one type of forwarder 30 may be located at the server computer system 14 and capable of consuming vast amounts of data from a potentially large number of edge devices 12. Accordingly, a forwarder may, for example, comprise a computing device that implements multiple data pipelines or "queues" to handle forwarding of data to the indexers 34.

A forwarder 30 may also perform many of the functions that are performed by an indexer 34. For example, the forwarders 30 may perform keyword extractions on raw data or parse raw data to create events. The forwarders 30 may generate time stamps for events. Additionally or alternatively, the forwarders 30 may perform routing of events to the indexers 34. The data stores 36 may contain events derived from raw data obtained from a variety of data sources 32, which may be generated by the edge devices 12.

Lastly, a search head 38 can perform a search query of the data stored in the data stores 36.

2.1.1. Data Ingestion

Figure 4:
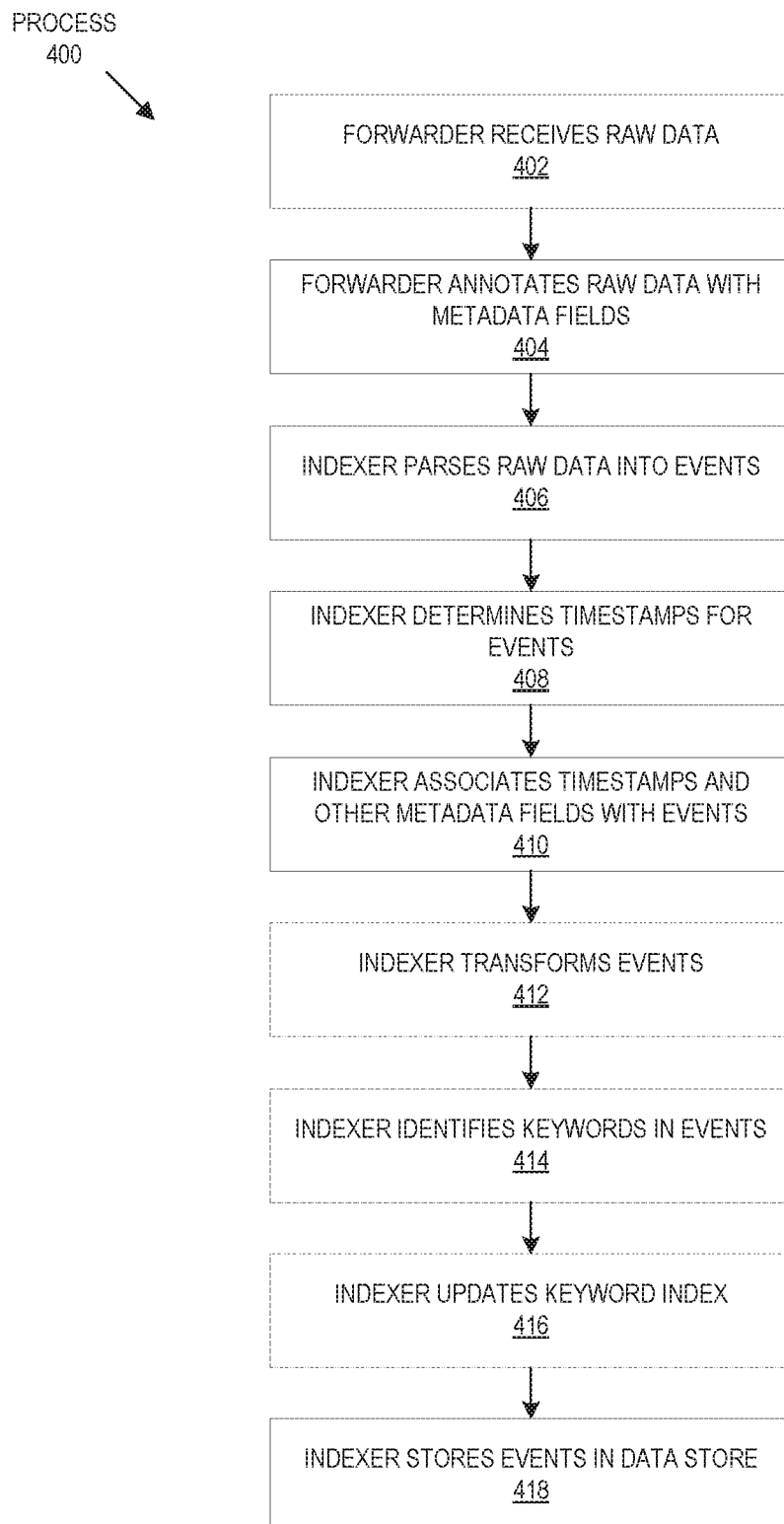
FIG. 4 is a flow diagram illustrating a process performed by a data intake and query system.

FIG. 4 is a flow diagram illustrating a process 400 performed by the data intake and query system 24 according to an embodiment. The illustrated data flow is provided for illustrative purposes only, and those skilled in the art would understand that one or more of the steps of the process 400 may be removed, or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.1.2. Input

In step 402, a forwarder receives raw data generated by an input source, such as the data sources 32 shown in FIG. 3. For example, the forwarder may receive a stream of raw sensor data generated at an edge device. In one embodiment, the forwarder receives the raw data and segments the data stream into "blocks," possibly of uniform data size, to facilitate subsequent processing.

In step 404, the forwarder can annotate each segment of raw data with one or more metadata fields. These metadata fields may provide information related to the data segment as a whole and may apply to each event that is subsequently derived from the raw data in the data segment. For example, the metadata fields may include separate fields specifying each of a host, a source, and a source type related to the data segments.

A host field may contain a value identifying a host name or IP address of the edge device that generated the raw data. A source field may contain a value identifying a source of the raw data, such as a pathname of a file or a protocol and port related to received network data. A source type field may contain a value specifying a particular source type label for the data. Additional metadata fields may also be included during the input phase, such as a character encoding of the raw data, if known, and possibly other values that provide information relevant to later processing steps. In an embodiment, a forwarder forwards the annotated data segments to another system component (typically an indexer) for further processing.

The SPLUNK® ENTERPRISE system allows forwarding of data from one SPLUNK® ENTERPRISE instance to another, or even to a third-party system. The SPLUNK® ENTERPRISE system can employ different types of forwarders in a configuration. In an embodiment, a forwarder may contain the essential components needed to forward data. It can gather data from a variety of inputs and forward the data to a SPLUNK® ENTERPRISE server for indexing and searching. It also can tag metadata (e.g., source, source type, and host).

In an embodiment, a forwarder has the capabilities of the aforementioned forwarder, as well as additional capabilities. The forwarder can parse and index data before forwarding the data (e.g., associate a time stamp with a portion of data and create an event) and can route data based on criteria, such as source or type of event. It can also index data locally while forwarding the data to another indexer.

2.1.3. Parsing

At step 406, an indexer receives data segments from the forwarder and parses the data to organize the data into events. In an embodiment, to organize the data into events, an indexer may determine a source type associated with each data segment (e.g., by extracting a source type label from the metadata fields associated with the data block) and refer to a source type configuration corresponding to the identified source type. The source type definition may include one or more properties that indicate to the indexer to automatically determine the boundaries of events within the data.

In general, these properties may include regular expression-based rules or delimiter rules where, for example, event boundaries may be indicated by predefined characters or character strings. These predefined characters may include punctuation marks or other special characters, including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

In step 408, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of raw data in the event, to interpolate time values based on timestamps associated with temporally proximate events, to create a timestamp based on a time the event data was received or generated, to use the timestamp of a previous event, or to use any other rules for determining timestamps.

In step 410, the indexer associates each event with one or more metadata fields, including a field containing the timestamp (in some embodiments, a timestamp may be included in the metadata fields) determined for the event. These metadata fields may include a number of "default fields" that are associated with all events, and may also include one or more custom fields, as defined by a user. Similar to the metadata fields associated with the data segments in step 404, the default metadata fields associated with each event may include a host, source, and source type field, including or in addition to a field storing the timestamp.

In step 412, an indexer may optionally apply one or more transformations to raw data included in the events created in step 406. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.1.4. Indexing

In steps 414 and 416, the indexer can optionally generate a keyword index to facilitate fast keyword searching for event data. To build a keyword index, in step 414, the indexer identifies a set of keywords in each event. In step 416, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can be generated automatically for some or all of the name-value pairs at the time of indexing. For example, if the string "dest=10.0.1.2" is found in an event, a field named "dest" may be created for the event, and assigned a value of "10.0.1.2".

In step 418, the indexer stores the events with an associated timestamp in a data store. The timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Referring back to FIG. 3, each indexer 34-1 through 34-3 may be responsible for storing and searching a subset of the events contained in a corresponding data store 36. By distributing events among the indexers 34 and data stores 36, the indexers 34 can analyze events for a query in parallel. For example, using map-reduce techniques, each indexer 34-1 through 34-3 returns partial responses for a subset of events to the search head 38, which combines the results to produce an answer for the query. By storing events in buckets for specific time ranges, the indexers may further optimize data retrieval processes by searching buckets corresponding to time ranges that are relevant to a query.

Moreover, events and buckets can also be replicated across different indexers and data stores to facilitate high availability and disaster recovery, as described in U.S. Pat. No. 9,130,971, titled "SITE-BASED SEARCH AFFINITY," filed on 30 Apr. 2014, and in U.S. Pat. No. 9,124,612, titled "MULTI-SITE CLUSTERING," also filed on 30 Apr. 2014, each of which is hereby incorporated by reference in its entirety.

2.2. Query Processing

Figure 5:
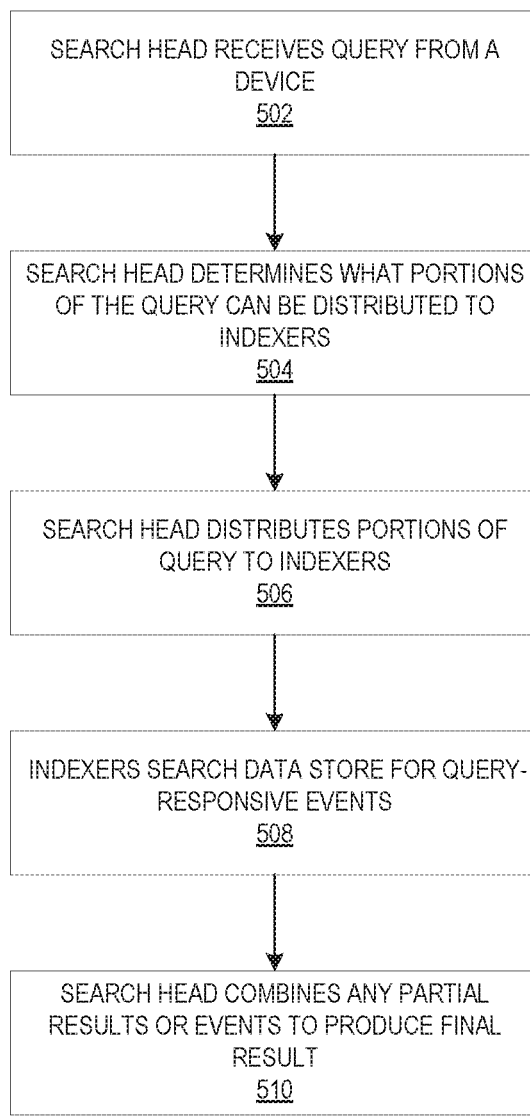
FIG. 5 is a flow diagram illustrating a process performed by a search head and indexers to perform a search query.

FIG. 5 is a flow diagram illustrating a process 500 for how a search head and indexers perform a search query according to an embodiment. In step 502, a search head receives a search query from another device. In step 504, the search head analyzes the search query to determine what portion(s) of the query can be delegated to indexers and what portions of the query can be executed locally by the search head.

In step 506, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in the figures) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

In step 508, the indexers to which the query was distributed search data stores associated with them for events that are responsive to the query. To determine which events are responsive to the query, the indexer searches for events that match the criteria specified in the query. These criteria can include matching keywords or specific values for certain fields. The searching operations at step 508 may use the late-binding schema to extract values for specified fields from events at the time the query is processed. In an embodiment, one or more rules for extracting field values may be specified as part of a source-type definition. The indexers may then either send the relevant events back to the search head, or use the events to determine a partial result, and send the partial result back to the search head.

In step 510, the search head combines the partial results and/or events received from the indexers to produce a final result for the query. This final result may comprise different types of data, depending on what the query requested. For example, the results can include a listing of matching events returned by the query, or some type of visualization of the data from the returned events. In another example, the final result can include one or more calculated values derived from the matching events.

The results generated by the system 10 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs," and the client may retrieve the results by referring to the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.3. Field Extraction

Referring back to FIG. 3, the search head 38 allows for searching and visualizing event data extracted from raw data received from homogenous data sources. The search head 38 includes various mechanisms, which may additionally reside in an indexer 34, for processing a query. SPLUNK Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 38 uses extraction rules to extract values for the fields associated with a field or fields in the event data being searched. The search head 38 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 38 can apply the extraction rules to event data that it receives from indexers 34. The indexers 34 may apply the extraction rules to events in an associated data store 36. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

3.0. Computing Architecture

As indicated above, the edge devices 12 can represent a broader category of computing devices referred to as client devices, which can include any computing device capable of interacting with the server computer system 14 over the one or more networks 16. Reference to an edge device in this disclosure is solely to aid in understanding a particular non-limiting embodiment. In addition to edge devices, examples of client devices include, without limitation, smart phones, tablet computers, handheld computers, wearable devices, laptop computers, desktop computers, servers, portable media players, gaming devices, and so forth.

3.1. Client Side Architecture

Figure 6:
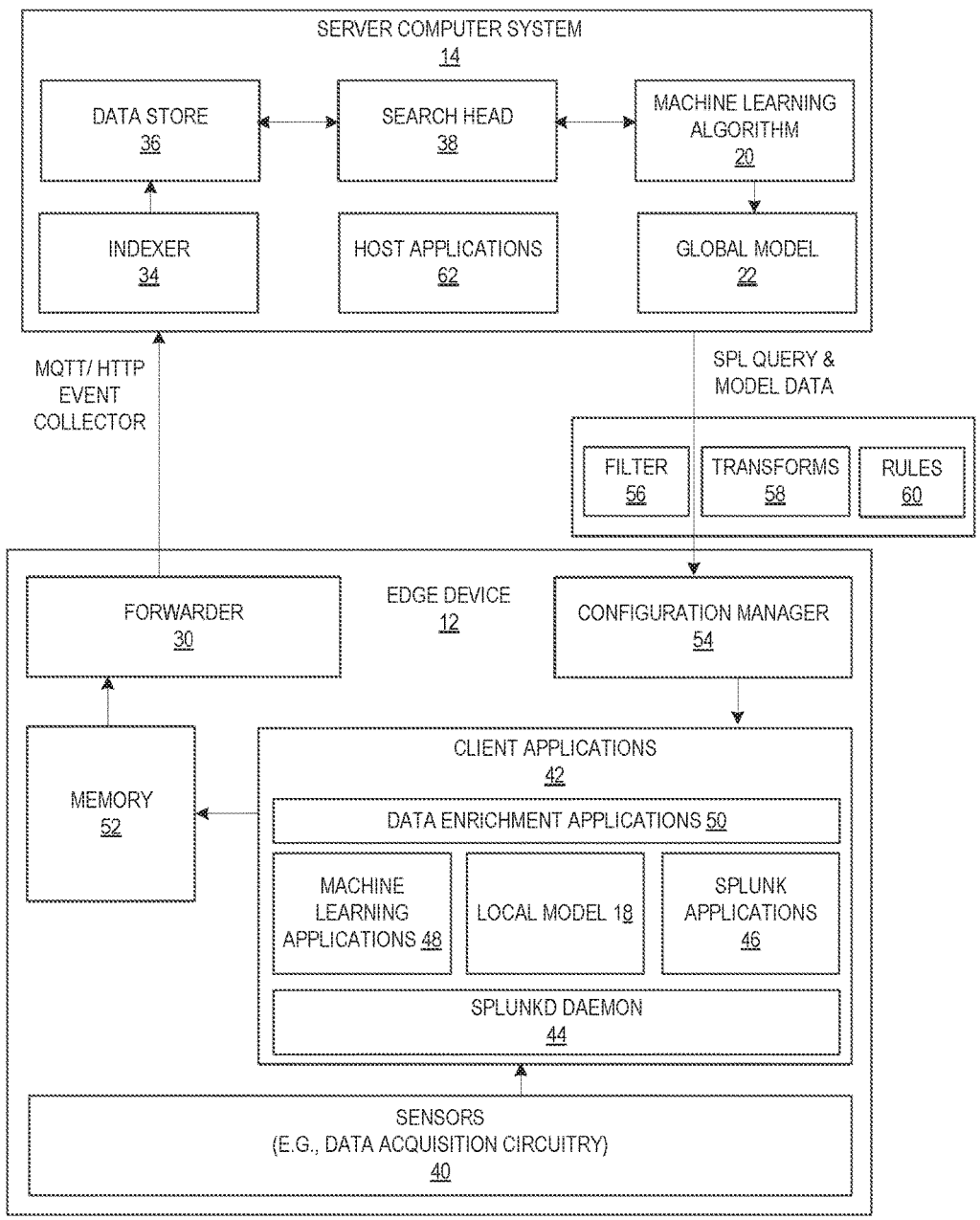
FIG. 6 is a block diagram illustrating components of an edge device connected to a server computer system.

FIG. 6 is a block diagram illustrating components of an edge device 12 connected to the server computer system 14 according to an embodiment. In the illustrated embodiment, the edge device 12 includes one or more sensors 40, which broadly represent data acquisition circuitry. The sensors 40 can generate raw data that can be used by the edge device 12 to perform one or more local actions. The sensors 40 may generate various types of raw data from electrical or optical input signals, etc. For example, a thermocouple is a sensor that generates voltage output data in response to environmental temperature inputs. In another example, an image sensor can capture and convey information that constitutes an image.

The edge device 12 may include one or more client applications 42 that may be configured to monitor or generate edge data in response to a trigger in the code of the client applications 42 or other triggering events, and to store the edge data on memory 52. In particular, the edge data can be stored in one or more data records on the memory 52.

The client applications 42 may include a SPLUNKD daemon 44, which operates as a background process that performs various operations without direct interaction from another device or a user. For example, the SPLUNKD daemon 44 can run as a background process to collect raw data from the sensors 40.

The edge device 12 may host and/or execute one or more SPLUNK applications 46, machine learning applications 48, and/or data enrichment applications 50. These client applications 42 can collectively implement functions including optimized data collection, monitoring, management, etc. As a result, the client applications 42 can enable, manage, or control local actions taken by the edge device 12 based on the raw data generated by the sensors 40.

For example, the SPLUNK applications 46 may manage the behavior of the sensors 40 that capture images of objects or process the image data. The client applications 42 may include the local model 18, which can be trained locally with the machine learning applications 48. For example, local data can be processed with the local model 18 to make predictions used to determine whether the edge device 12 performs a local action, and the type of location action that will be performed. Other functions can instead or additionally be performed in the edge device 12 based on the local model 18.

The data enrichment applications 50 can enhance the functionality of the edge device 12. For example, a data enrichment application can be applied to annotate outputs of the machine learning applications 48. For example, a data enrichment application can augment detection of objects by an image sensor to perform real-time video analytics such as object detection, facial detection and recognition, multi object tracking, etc. The client applications 42 may include a "plug-in" or "extension" to another application, such as a web browser plug-in or extension. The client applications 42 may interact with the server computer system 14 or other edge devices over the networks 16.

In an embodiment, the client applications 42 may include monitoring functions that monitor edge data or facilitate generating edge data related to the edge device's operating state, including monitoring local data and collecting other edge device and/or application-specific information. The monitoring functions may be integrated into a plug-in, an extension, or any other type of add-ons. The monitoring functions may also be a stand-alone process.

In an embodiment, the monitoring functions may be created using a software development kit (SDK) that can incorporate monitoring code into the client applications 42. The SDK or other code for implementing the monitoring functionality may be offered by a provider of the data intake and query system 24. In such cases, the provider of the data intake and query system 24 can implement the custom code so that edge data is sent to the data intake and query system 24 to facilitate analysis of the edge data by a developer of the client applications 42 or other users.

In an embodiment, the custom monitoring code may be incorporated into the code of the client applications 42 to call or otherwise invoke the monitoring functionality. A developer of any of the client applications 42 can add one or more lines of code into a client application to trigger the monitoring functionality as desired. Code that triggers the monitoring functions may be referred to as a monitor trigger. For instance, a monitor trigger may be included at or near the beginning of the executable code of a client application such that the monitoring functionality is initiated or triggered as a client application is launched, or included at other points in the code that correspond to various actions of the client applications 42.

In an embodiment, the monitoring functions may monitor one or more aspects of network traffic sent and/or received by the client applications 42 over the networks 16. The network traffic can be analyzed to determine a number of network performance statistics. Monitoring network traffic may enable information to be gathered particular to the network performance associated with any of the client applications 42.

Network performance data refers to data that indicates information about the network and/or network performance. Network performance data may include, for instance, a URL request, a connection type (e.g., HTTP or HTTPS), a connection start time, a connection end time, an HTTP status code, request length, response length, request headers, response headers, connection status (e.g., completion, response time(s), or failure), and the like. Upon obtaining network performance data indicating performance of the networks 16, the network performance data can be sent to the data intake and query system 24 for analysis.

Upon developing the client applications 42 that incorporate the monitoring functionality, the client applications 42 can be distributed to the edge devices 12. The client applications 42 generally can be distributed to the edge devices 12 in any manner, or they can be pre-loaded. In some cases, the client applications 42 may be distributed to the edge device 12 via an application marketplace or other application distribution system. For instance, an application marketplace or other application distribution system might distribute the application to a client device based on a request from the edge device 12 to download the application.

Examples of functionality that enables monitoring performance of a client device are described in U.S. patent application Ser. No. 14/524,748, titled "UTILIZING PACKET HEADERS TO MONITOR NETWORK TRAFFIC IN ASSOCIATION WITH A CLIENT DEVICE," filed on 27 Oct. 2014, and which is hereby incorporated by reference herein in its entirety.

In an embodiment, the monitoring functionality may monitor and collect performance data related to an aspect of the operational state of client applications 42 and/or edge device 12. For example, the monitoring functions may collect edge device performance information by monitoring one or more edge device operations, or by making calls to an operating system and/or one or more other applications executing on the edge device 12 for performance information. Edge device performance information may include, for instance, a current wireless signal strength of the edge device 12, a current connection type and network carrier, current memory performance information, a geographic location of the device, a device orientation, and any other information related to the operational state of the edge device 12.

In an embodiment, the client applications 42 may also monitor and collect other device profile information, including, for example, a type of edge device, a manufacturer and model of the edge device, versions of various software applications installed on the edge device, and so forth.

In the illustrated embodiment, components of the data intake and query system 24 are distributed between the edge device 12 and the server computer system 14. Specifically, the edge device 12 includes the forwarder 30, which can forward data to the indexer 34 of the server computer system 14. In an embodiment, the forwarder 30 can send transformed events in batches to the server computer system 14. As detailed below, the server computer system 14 further includes the data store 36 to store events, as detailed above, which can be searched by the search head 38 to extract data items. Further, the extracted data items can be used by the machine learning algorithms 54 to update/train the global model 22.

Accordingly, the forwarder 30 enables event collection by the server computer system 14. In some embodiments, the edge data can be communicated to the server computer system 14 using Hypertext Transfer Protocol (HTTP) or MQ Telemetry Transport (MQTT) protocols. Specifically, MQTT is an M2M IoT connectivity protocol useful for connections with remote locations where a relatively small code footprint is required and/or network bandwidth is limited.

3.2. Server Side Architecture

In the illustrated embodiments, the server computer system 14 can send pipelined search language queries, such as SPLUNK Processing Language (SPL) queries, and can send model data used by a configuration manager 54 to configure (or reconfigure) an edge device 12. For example, an SPL query may configure the edge device 12 to monitor certain edge data. The model data may be used in the edge device 12 to configure (or reconfigure) the local model 18. For example, the model data can be used to replace or update the local model 18 with the global model 22. The global model 22 and the local mode 18 each can be, for example, a mathematical equation, a logic operation or other type of computation, a lookup table or an algorithm embodied in computer program code. One or more filters 56, transforms 58 and/or rules 60 may be used to configure the edge device 12 to send summary data, based on its locally acquired data, back to the server computer system 14. The data summary sent from each of the edge devices 12 then can form global training data to train the global model 22 on the server computer system 14. The filters 56, transforms 58 and/or rules 60 can be included in each edge device 12.

The server computer system 14 can represent a broader category of computing devices referred to as host devices, which can include any number of computers, virtual machine instances, and/or data centers that can be configured to host or execute one or more instances of host applications (e.g., host applications 62). The server computer system 14 or another host device may be involved, directly or indirectly, in processing requests received from the edge device 12 for a network-based service. For example, a network-based service provider may configure one or more host devices and host applications to collectively implement the network-based application.

The edge device 12 can communicate with the host applications 62 to exchange information. The communication between the edge device 12 and the host applications 62 may be based on HTTP or any other network protocol. Content delivered from the host applications 62 to the edge device 12 may include, for example, HTML documents, media content, etc. The communication between the edge device 12 and host applications 62 may include sending requests and receiving data packets. For example, the client applications 42 may initiate communication with host applications 62 by requesting a specific resource, and the host device may respond with the requested content stored in one or more response packets.

A host device may generate various types of performance data during operation of the host applications 62, including event logs, network data, sensor data, and other types of machine-generated data. The host data or data related to an interaction between the host device and the edge device 12 could be subjected to data intake and query processes.

4.0. Embodiments of System Operations

Figure 7:
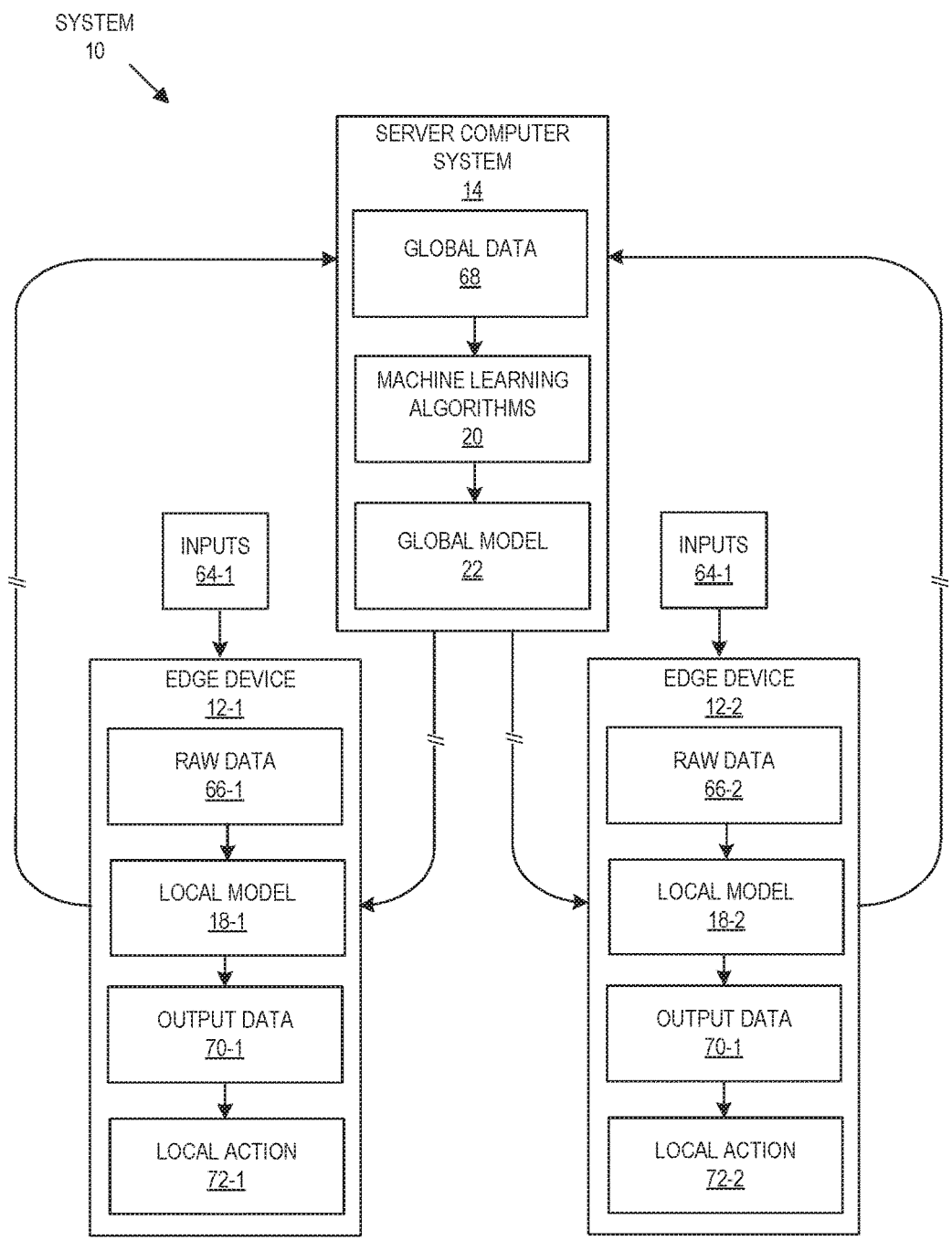
FIG. 7 is a block diagram illustrating an operation of an embodiment of the system to improve analytics for edge devices, including a server computer system connected to edge devices collectively implementing machine learning.
Figure 8:
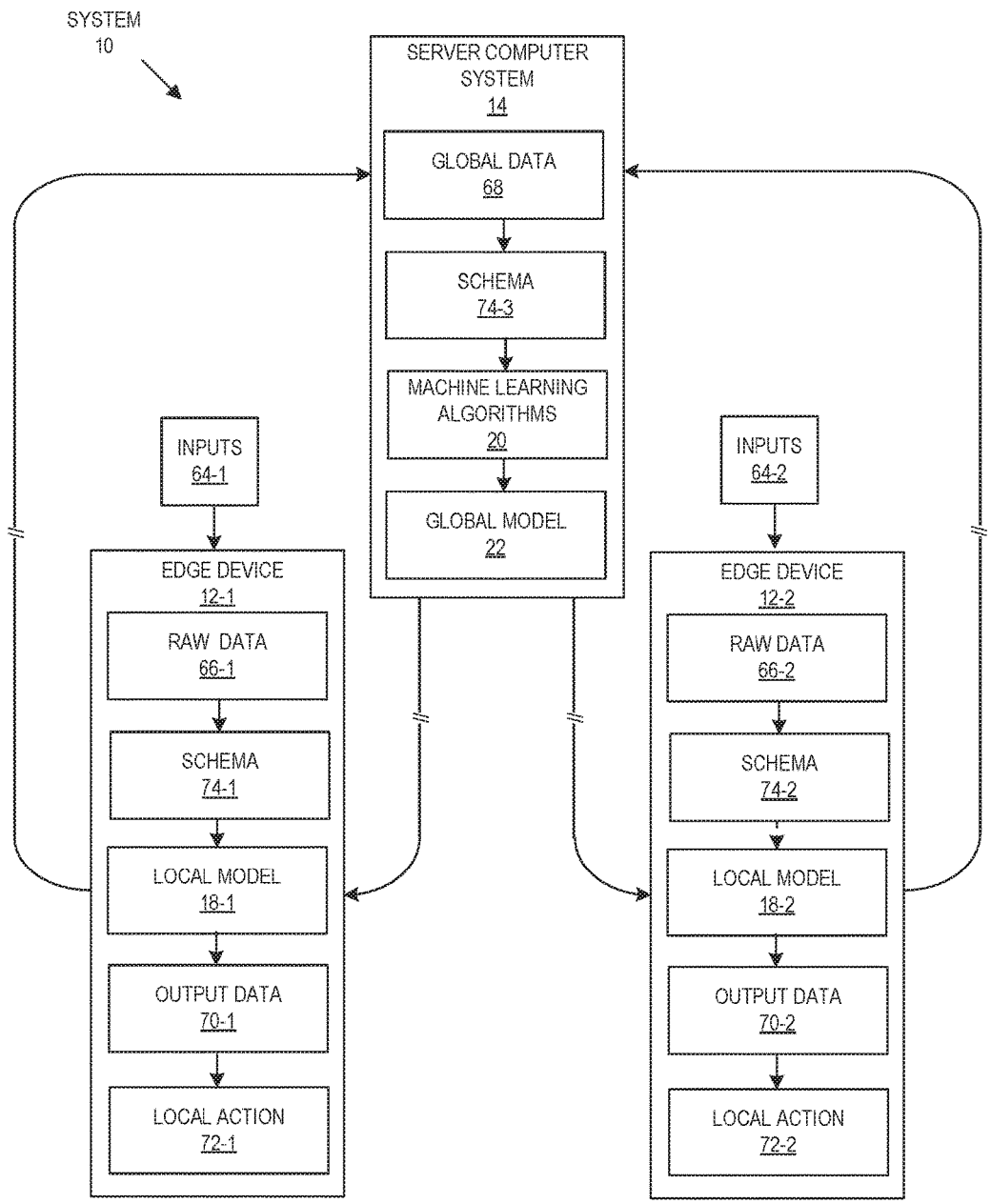
FIG. 8 is a block diagram illustrating an operation of an embodiment of the system to improve analytics for edge devices similar to FIG. 7, but which can implement the binding of schemas at the edge devices or the server computer system.
Figure 9:
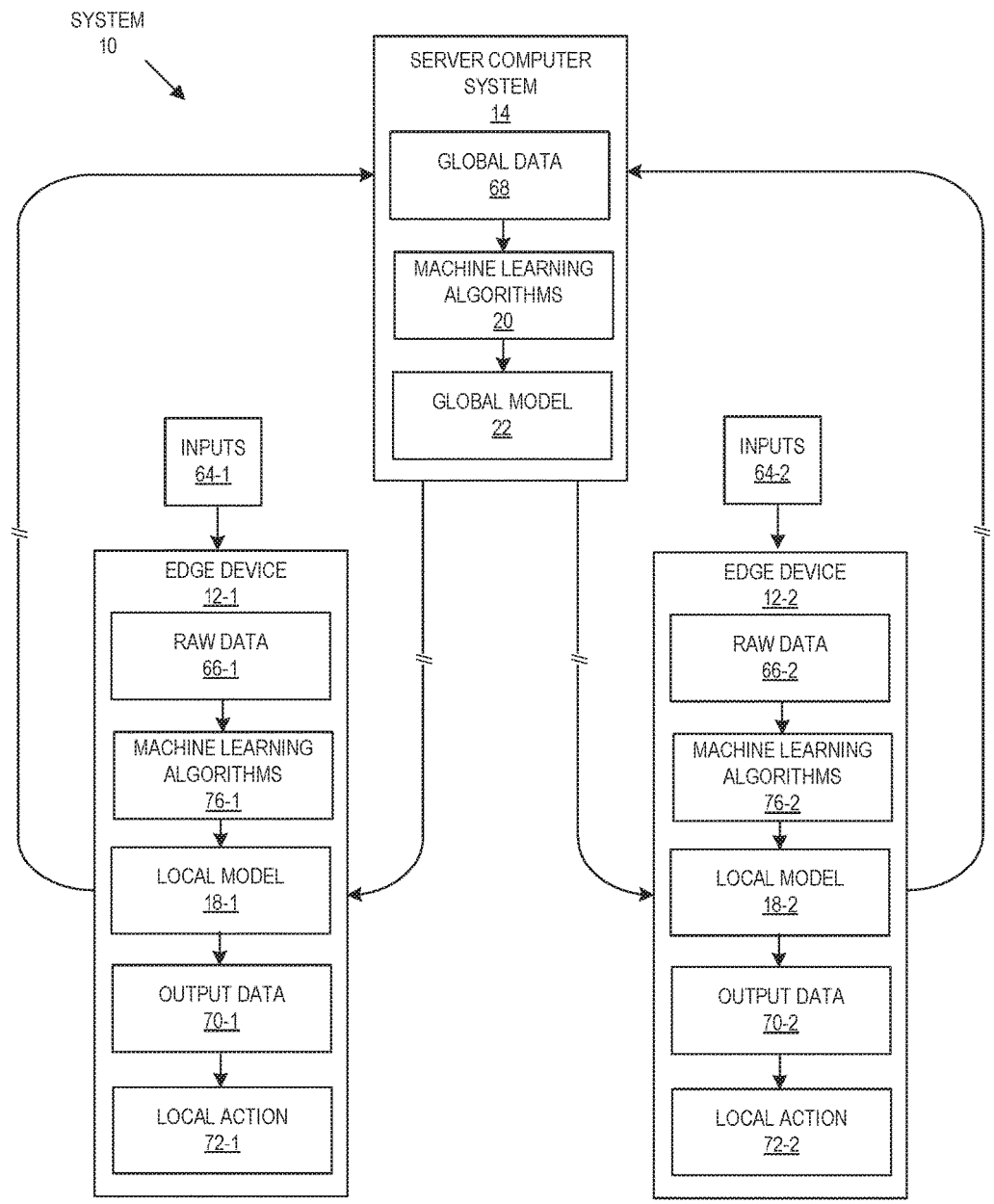
FIG. 9 is a block diagram illustrating an operation of an embodiment of the system to improve analytics for edge devices similar to FIG. 7, but which can implement machine learning locally at the edge devices.

FIGS. 7 through 9 are block diagrams that illustrate operations of the system 10 implementing components of the disclosed technology in different combinations. Although shown as three separate embodiments, the components illustrated in these figures can be combined in various ways to achieve a desired behavior for the system 10. Moreover, embodiments may omit components or include other components not shown but known to persons skilled in the art.

4.1. Global Learning

FIG. 7 is a block diagram illustrating an operation of an embodiment of the system 10, including a server computer system 14 connected to edge devices 12. In the illustrated embodiment, the server computer system 14 is only intermittently connected to the edge devices 12. The edge devices 12 receive local inputs 64 to generate raw data 66 according to their designed functions. At least a portion of the raw data 66 from each edge device 12 is sent to the server computer system 14 as training data, and collectively forms global training data 68. The amount of training data sent by each edge device 12 may be specified prior to operation or determined during operation (i.e., "on the fly"). The training data is sent while the respective edge device 12 is connected to the server computer system 14.

At least a portion of the raw data 66 at each edge device 12 is processed with a local model 18 to produce output data 70. In some embodiments, at least a portion of the output data 70 can be pushed to the server computer system 14 as training data. The respective edge device 12 may execute a local action 72 based on its output data 70. For example, an edge device may change a thermostat setting after processing temperature data with a local model.

The server computer system 14 can apply at least a portion of the global training data 68 as inputs to one or more machine learning algorithms 20 (processes) for training a global model 22. Hence, the global model 22 is trained based on data generated by the multiple distributed edge devices 12. Model data is sent back to each of the edge devices 12 to update each local model 18 accordingly. For example, the server computer system 14 may push an instance of the global model 22 in the model data to each edge device 12. As such, each of the edge devices 12 can update their local models based on the model data to synchronize the local model 18 with the global model 22. Accordingly, each edge device 12 can learn (indirectly) from other distributed edge devices 12 to process local data in a global context.

4.1.1. Schemas

FIG. 8 is a block diagram illustrating an operation of an embodiment of the system 10 similar to FIG. 7, but which can implement schemas at the edge devices 12 and/or the server computer system 14. In some embodiments, each of the edge devices 12-1 and 12-2 and/or the server computer system 14 implements a separate data intake and query process that applies a schema to extract data items. In some embodiments, components of a single data intake and query system 24 can be distributed among the edge devices 12 and the server computer system 14, as shown in FIG. 6. Different types of schemas could be applied at each of the edge devices 12 and/or the server computer system 14 to extract data items that can be subsequently processed, as described with respect to FIG. 7, to update models or perform actions.

For example, each data intake and query process can segment data and index the segmented data into events. A schema is applied to the events to extract data items. For example, a late binding schema can be applied to extract the data items after the segmented data is indexed into events. In another example, the data items can be specified prior to operation and/or extracted before the data segments are indexed into events.

In the illustrated embodiment, each of the edge devices 12-1 and 12-2 can apply a schema 74-1 and 74-2 to the raw data 66-1 and 66-2, respectively, to extract data items for performing local actions and/or as training data sent to the server computer system 14. Also in the illustrated embodiment, the server computer system 14 can apply a schema 74-3 to the global training data 68 to extract global data items for training the global model 22.

4.1.2. Local Learning

FIG. 9 is a block diagram illustrating an embodiment of the system 10 similar to that in FIG. 7 but which can implement local machine learning at the edge devices 12. In the illustrated embodiment, each edge device 12-1 and 12-2 includes one or more machine learning algorithms 76-1 and 76-2, respectively. The machine learning algorithms 76 can update/train the respective local models 18 when their edge devices 12 are connected or disconnected from the server computer system 14. For example, the edge devices 12 can use their local machine learning algorithms 76 to update/train their local models 18 when the global model 22 is unavailable to update the local models 18. In some embodiments, any of the machine learning algorithms 76 can be changed on the fly, which would change the model generated by the edge devices 12.

For example, an edge device can be disconnected from the server computer system 14. The edge device can perform a local machine-learning process to train its local model 18 with raw data or data items. The edge device 12 can subsequently process local data with the locally updated local model while the edge device 12 is disconnected from the server computer system 14. The edge device 12 can execute a local action as a function of the output data generated with the locally updated local model 18. Accordingly, the system 10 can improve the local performance of each of the edge devices 12 and harmonize the collective operations of all the edge devices 12 with global model data at the server computer system 14.

4.2. Operation of Edge Device

Figure 10:
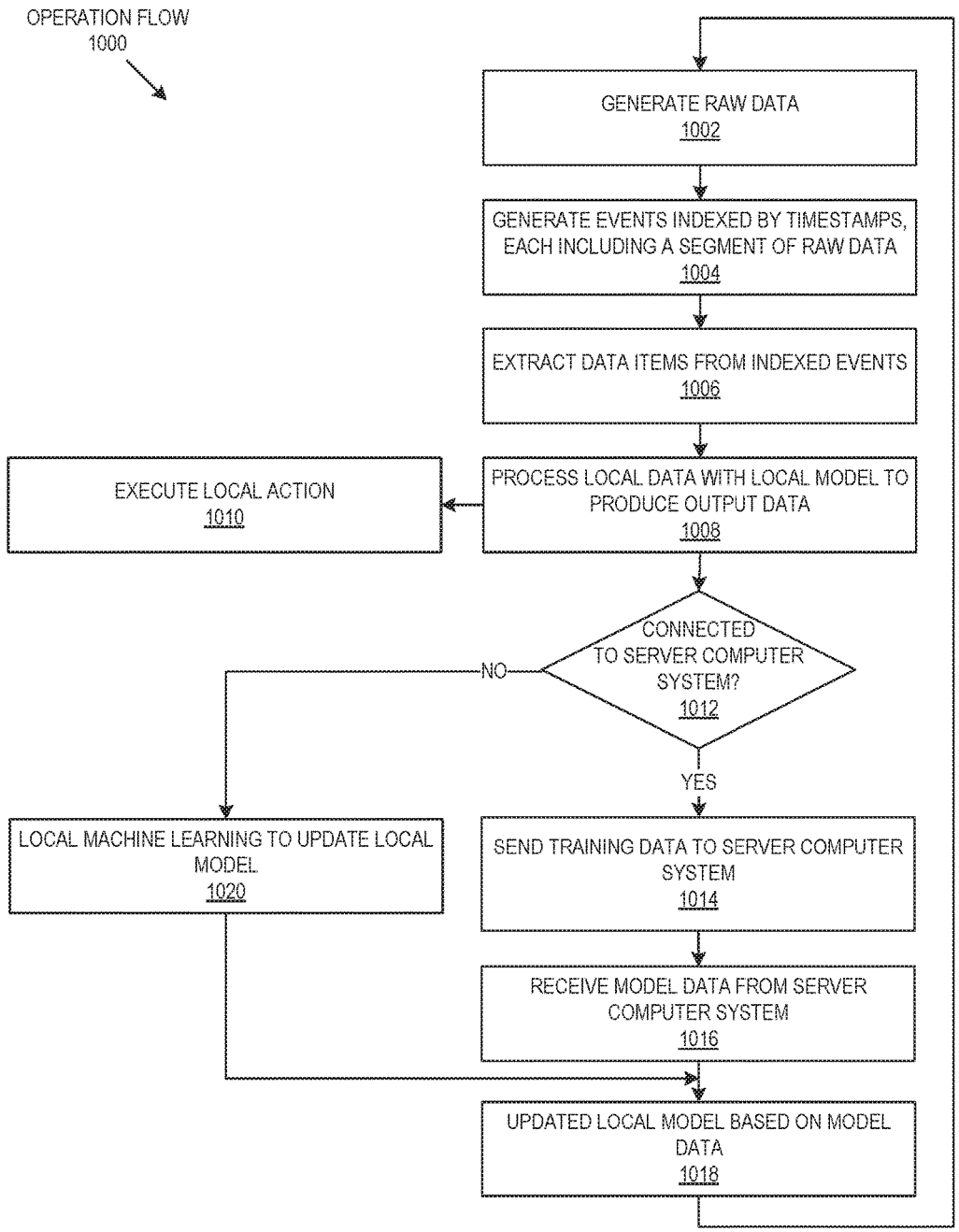
FIG. 10 is an operation flow diagram illustrating an example of an operation flow of an edge device according to an embodiment.

FIG. 10 is an operation flow diagram illustrating an example of an operation flow 1000 of an edge device according to an embodiment. In step 1002, the edge device generates raw data from inputs to the edge device. For example, the edge device can have a camera that captures an image of a detected object. In this example, the image can be raw image data.

In 1004 and 1006, the edge device may be operable to implement a data intake and query process to segment the raw data from step 1002, and index the segmented data into events. The events can be searched to extract data items or other data derived from the raw data. In some embodiments, a late binding schema is applied to extract the data items. Specifically, the data items are extracted from the raw data after being indexed into events. In some embodiments, the data items are predetermined and/or extracted from the raw data before being indexed into events. The raw data or data derived from the raw data may be referred to as local data.

In step 1008, the raw data and/or data items are processed with a local model to produce output data. In step 1010, the edge device may execute a local action as a function of the output data. For example, the edge device can change a temperature setting (local action) of a thermostat as a result of processing temperature data (raw data) with the local model.

In decision step 1012, the edge device can determine whether or not it is connected to or disconnected from a server computer system (having global model data) over one or more networks. If connected to the server computer system, the edge device may perform machine-to-machine (M2M) communications over the networks with the server computer system. For example, in step 1014, the edge device can send raw data and/or data items as training data to the server computer system 14.

In some embodiments, the amount of training data could be predetermined as a portion (or all) of the raw data or data items. For example, 10 percent of the raw data generated by multiple edge devices could be pushed periodically to the server computer system. In some embodiments, the portion of the training data may comprise or exclude outlier data. Limiting the amount of data communicated to the server computer system advantageously reduces network security threats because less data is susceptible to theft. Further, this reduces total cost of ownership (TCO) because the use of network resources is reduced.

In step 1016, the edge device receives model data from the server computer system. The model data is derived from the training data collected from the edge devices ("global training data") at the server computer system. In particular, the global training data is input to one or more machine-learning processes (e.g., algorithms) to generate a global model. As such, the global model is trained by harmonizing local data from the edge devices. The model data can include the global model or data related to the global model, such as parameters indicative of changes necessary to synchronize a local model with the global model.

In step 1018, the local model of the edge device is updated with the model data. Hence, the local model can be synchronized with the global model such that local data is subsequently processed with the updated local model in light of a global context. In some embodiments, the local model is replaced with the global model or updated with parameter values that modify the local model accordingly.

In step 1020, if the edge device is disconnected from the server computer system, the edge device may update the local model locally. For example, the edge device can input a portion (or all) of the raw data or data items into one or more local machine-learning processes (e.g., algorithms) to generate a locally updated local model. Lastly, the edge device can execute a local action as a function of output data generated with the locally updated local model. Thus, the edge device can update the local data based on the global model or by processing local data with local machine learning algorithms.

4.3. Server Computer System Operations

Figure 11:
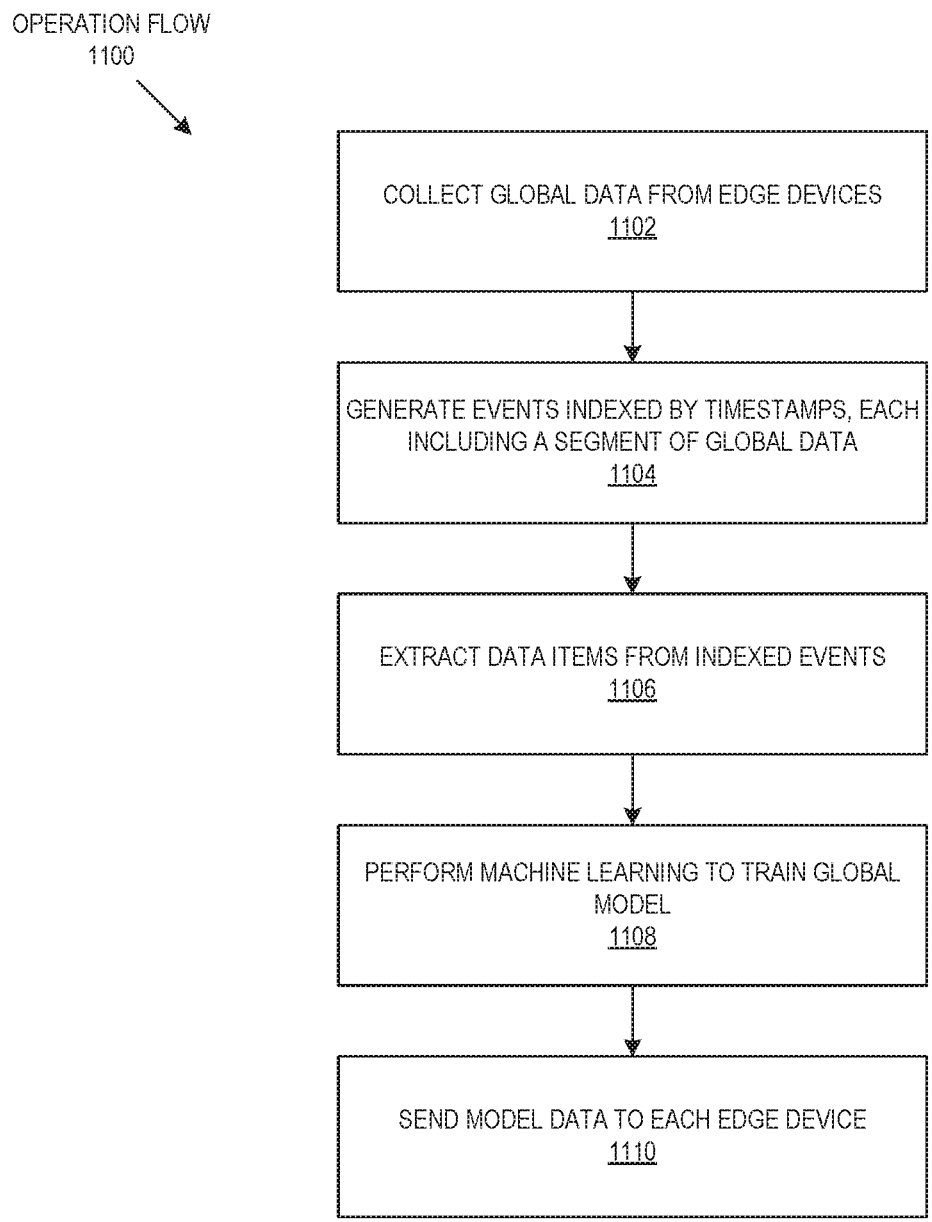
FIG. 11 is an operation flow diagram illustrating an example of an operation flow of a server computer system according to an embodiment.

FIG. 11 is an operation flow diagram illustrating an example of an operation flow 1100 of a server computer system according to an embodiment. In step 1102, the server computer system collects raw data or data items from the edge devices connected to the server computer system over the networks to provide global training data.

In steps 1104 and 1106, the server computer system may be operable to implement a data intake and query process to segment the global training data and index the segmented data into events. The events can be searched to extract global data items or other data derived from the global training data. In some embodiments, a late binding schema is applied to extract the global data items. Specifically, the global data items are extracted from the global training data after being indexed into events. In some embodiments, the global data items are predetermined and/or extracted from the global training data before being indexed into events.

In step 1108, the server computer system executes one or more machine-learning processes to train the global model with the global training data or the global data items. In step 1110, the server computer system sends the model data based on the updated global model to each of the edge devices. As indicated above, the model data can include data suitable to change or replace a local model for each respective edge device. As a result, each of the local models can be synchronized with the global model. As indicated above, in some embodiments, at least some of the plurality of edge devices are only intermittently connected to the server computer system. As such, the server computer system only exchanges training data with each edge device and model data when the edge device is connected to the server computer system.

5.0. Computing System Architecture

Figure 12:
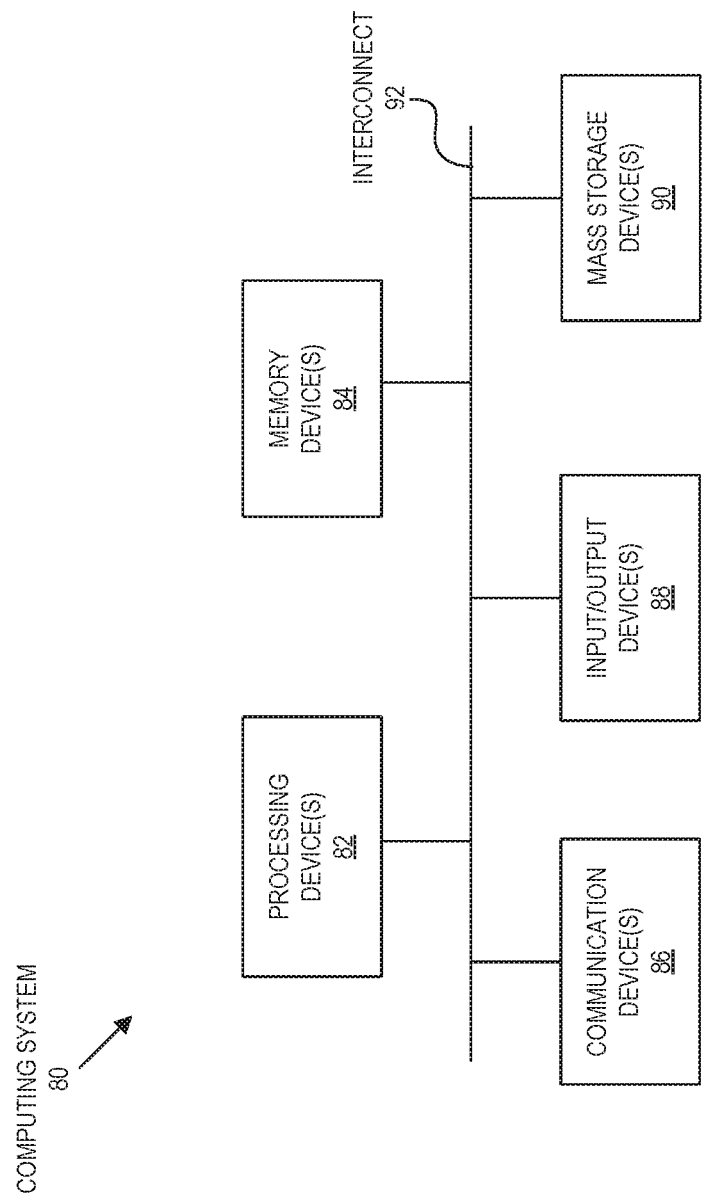
FIG. 12 is a block diagram illustrating a high-level example of a hardware architecture of a computing system that can be used to implement any one or more of the functional components described herein.

FIG. 12 is a block diagram illustrating a high-level example of a hardware architecture of a computing system 80 that can be used to implement any one or more of the functional components described herein (e.g., forwarder, indexer, search head, and data store, server computer system, edge device). In some embodiments, one or multiple instances of the computing system 80 can be used to implement the techniques described herein, where multiple such instances can be coupled to each other via one or more networks.

The illustrated computing system 80 includes one or more processing devices 82, one or more memory devices 84, one or more communication devices 86, one or more input/output (I/O) devices 88, and one or more mass storage devices 90, all coupled to each other through an interconnect 92. The interconnect 92 may be or include one or more conductive traces, buses, point-to-point connections, controllers, adapters, and/or other conventional connection devices. Each of the processing devices 82 controls, at least in part, the overall operation of the processing of the computing system 80 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 84 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 90 can be or include one or more hard drives, digital versatile disks (DVDs), flash memories, or the like. Each memory device 84 and/or mass storage device 90 can store (individually or collectively) data and instructions that configure the processing device(s) 82 to execute operations to implement the techniques described above.

Each communication device 86 may be or include, for example, an Ethernet adapter, cable modem, Wi-Fi adapter, cellular transceiver, baseband processor, Bluetooth or Bluetooth Low Energy (BLE) transceiver, serial communication device, or the like, or a combination thereof. Depending on the specific nature and purpose of the processing devices 82, each I/O device 88 can be or include a device such as a display (which may be a touch screen display), audio speaker, keyboard, mouse or other pointing device, microphone, camera, etc. Note, however, that such I/O devices 88 may be unnecessary if the processing device 82 is embodied solely as a server computer.

In the case of a client device (e.g., edge device), the communication devices(s) 86 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 86 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 84). A processor (e.g., processing device(s) 82) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 82), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 84).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method comprising:
    generating, by an electronic device, raw data based on inputs to the electronic device;
    generating, by the electronic device, a plurality of events indexed by timestamps, each of the plurality of events including a respective segment of the raw data;
    extracting, by the electronic device, a data field from each of the plurality of events, the extracted data fields corresponding to data derived from the raw data;
    sending, by the electronic device, the raw data or data derived from the raw data over a network to a server computer system, the sent raw data or the data derived from the raw data including training data;
    receiving, by the electronic device, model data from the server computer system over the network, the model data having been derived by the server computer system from the training data by use of a machine learning process;
    generating, by the electronic device, an updated local model by updating a local model associated with the electronic device based on the received model data; and
    processing, by the electronic device, local data based on the updated local model to generate output data, the local data including raw data or data derived from raw data generated based on inputs to the electronic device.

2. The method of claim 1, further comprising:
    executing, by the electronic device, a local action based on the output data, the local action including at least one of changing an operational parameter of the electronic device or changing a setting controlled by the electronic device.

3. The method of claim 1, wherein the data fields are extracted after the plurality of events are indexed.

4. The method of claim 1, wherein the data fields are extracted while the plurality of events are being indexed.

5. The method of claim 1, wherein the output data is first output data, the method further comprising:
    experiencing, by the electronic device, a termination of all communication links with the server computer system;
    generating, by the electronic device, a locally updated local model by performing a machine learning process to train the updated local model with raw data or data derived from raw data;
    processing, by the electronic device, local data in accordance with the locally updated local model while the electronic device is communicatively disconnected from the server computer system to generate second output data; and
    executing, by the electronic device, a local action based on the second output data, the local action including at least one of changing an operational parameter of the electronic device or changing a setting controlled by the electronic device.

6. The method of claim 1, wherein the model data is derived from at least one of raw data or data derived from raw data generated by a plurality of electronic devices including the electronic device, the model data having been derived in accordance with the machine learning process.

7. The method of claim 1, wherein the electronic device is an endpoint device that forms an endpoint of a communications link over the network.

8. The method of claim 1, wherein sending the raw data or the data derived from the raw data over the network to the server computer system comprises:
    establishing a machine-to-machine (M2M) communications link between the electronic device and the server computer system; and
    sending, by the electronic device, the raw data or the data derived from the raw data via the machine-to-machine communications link to the server computer system.

9. The method of claim 1, wherein the training data is only a portion of raw data or data derived from raw data generated by the electronic device.

10. The method of claim 1, wherein updating the local model comprises:
    replacing the local model with a new local model included in the model data.

11. The method of claim 1, wherein updating the local model comprises:
    modifying the local model with data indicating changes to the local model included in the model data.

12. A method comprising:
    collecting, by a server computer system, global data from a plurality of electronic devices via a network, the global data including at least one of raw data or data derived from raw data generated locally by each of the plurality of electronic devices;
    generating, by the server computer system, a plurality of events indexed by timestamps, each of the plurality of events including a respective segment of the global data;

extracting, by the server computer system, a data field from each of the plurality of events to obtain the data derived from the global data;

generating, by the server computer system, an updated global model by executing a machine learning process to train a global model based on the global data or data derived from the global data, the updated global model being configured to enable the plurality of electronic devices each to generate local data-driven outputs based on inputs to the electronic devices; and sending, by the server computer system, model data based on the updated global model to each electronic device of the plurality of electronic devices, to cause the electronic device to modify or replace a local model of the electronic device based on the model data.

13. The method of claim 12, wherein the data fields are extracted after the plurality of events is indexed.

14. The method of claim 12, wherein the data fields are extracted while the plurality of events are being indexed.

15. The method of claim 12, wherein the server computer system is intermittently communicatively connected to at least one of the plurality of electronic devices.

16. The method of claim 12, wherein the model data for each of the electronic devices includes an instance of the updated global model configured to cause the electronic device to replace the local model associated with the electronic device with the instance of the global model.

17. The method of claim 12, wherein the model data for each of the electronic devices includes data configured to cause the electronic device to modify the local model associated with the electronic device in accordance with the updated global model.

18. An electronic device comprising:
a communication device through which the electronic device can communicate with a server computer system over a network;
a processor; and
memory containing instructions that, when executed by the electronic device, cause the electronic device to:
generate raw data based on inputs to the electronic device;
generate a plurality of events indexed by timestamps, each of the plurality of events including a respective segment of the raw data;
extract, after the plurality of events are indexed, a data field from each segment of raw data in each event, the extracted data fields corresponding to the data derived from the raw data;
send the raw data or data derived from the raw data over a network to a server computer system, the sent raw data or the data derived from the raw data including training data;
receive model data from the server computer system over the network, the model data having been derived by the server computer system from the training data by use of a machine learning process;
generate an updated local model by updating a local model associated with the electronic device based on the received model data; and
process local data based on the updated local model to generate output data, the local data including raw data or data derived from raw data generated based on inputs to the electronic device.

19. The electronic device of claim 18, wherein the instructions further cause the electronic device to:
execute a local action based on the output data, the local action including at least one of changing an operational parameter of the electronic device or changing a setting controlled by the electronic device.

20. The electronic device of claim 18, wherein the output data is first output data, and the instructions further cause the electronic device to:
experience termination of all communication links with the server computer system;
generate a locally updated local model by performing a machine learning process to train the updated local model with raw data or data derived from raw data;
process local data in accordance with the locally updated local model while the electronic device is communicatively disconnected from the server computer system to generate second output data; and
execute a local action based on the second output data, the local action including at least one of changing an operational parameter of the electronic device or changing a setting controlled by the electronic device.

21. The electronic device of claim 18, wherein the model data is derived from raw data or data derived from raw data generated by a plurality of electronic devices including the electronic device, the model data having been derived in accordance with the machine learning process.

22. The electronic device of claim 18, wherein the electronic device is an endpoint device configured to form an endpoint of a communications link over the network.

23. The electronic device of claim 18, wherein the model data is configured to modify the local model or replace the local model with a new local model included in the model data.

24. A server computer system comprising:
a communication device through which the server computer system can communicate with a plurality of electric devices over a network;
a processor;
and memory containing instructions that, when executed by the server computer system, cause the server computer system to:
collect global data from the plurality of electronic devices via a network, the global data including at least one of raw data or data derived from raw data generated locally by each of the plurality of electronic devices;
generate a plurality of events indexed by timestamps, each of the plurality of events including a respective segment of the global data;
extract a data field from each segment of global data in each event to obtain the data derived from the global data;
generate an updated global model by executing a machine learning process to train a global model based on the global data or data derived from the global data, the updated global model being configured to enable the plurality of electronic devices each to generate local data-driven outputs based on inputs to the electronic devices; and
send model data based on the updated global model to each electronic device of the plurality of electronic devices, to cause the electronic device to modify or replace a local model of the electronic device based on the model data.

25. The server computer system of claim 24, wherein the data fields are extracted after the plurality of events is indexed.

26. The server computer system of claim 24, wherein the server computer system is intermittently communicatively connected to at least one of the plurality of electronic devices.

27. The server computer system of claim 24, wherein the model data for each of the electronic devices includes an instance of the updated global model configured to cause the electronic device to replace the local model associated with the instance of the global model.

* * * * *